United States Patent Office 3,629,107
Patented Dec. 21, 1971

3,629,107
METAL-GRAPHITE COMPOSITIONS
Aleksander Jerzy Groszek and Rodney Ernest Witheridge, London, and Charles John Geach, Shepperton, England, assignors to The British Petroleum Company Limited, London, England
No Drawing. Filed Mar. 17, 1970, Ser. No. 20,399
Claims priority, application Great Britain, Mar. 31, 1969, 16,707/69
Int. Cl. C10m 7/04
U.S. Cl. 252—12
14 Claims

ABSTRACT OF THE DISCLOSURE

Intimate mixtures of oleophilic graphite and a metal are prepared by grinding graphite and the metal together in an organic liquid. The mixtures are useful as solid lubricants and grease-thickeners.

---

This invention relates to mixtures containing graphite, more particularly it relates to mixtures containing oleophilic graphite.

Oleophilic graphite is described in U.K. Pat. 1,168,785 and its use in lubricating compositions is described in U.K. Pat. 1,168,784.

We have now found that oleophilic graphite/metal compositions have useful properties as solid lubricants and as additives to lubricant compositions.

According to the invention there is provided a method of preparing oleophilic graphite/metal compositions which comprises grinding together a natural or synthetic graphite and a metal in an organic grinding liquid till a surface area of at least 5 square metres per gram is attained.

The invention also provides an intimate mixture of oleophilic graphite and a metal which has a ratio of heat of adsorption of n-dotriacontane from n-heptane to heat of adsorption of n-butanol from n-heptane of at least 3.5:1 and a surface area of at least 5 square metres per gram.

The heats of adsorption can be measured using a Flow-microcalorimeter as described in Chemistry and Industry, Mar. 20, 1965, pp. 482–89.

The metals preferably used are those of Groups I–B, II–B, III, IV and V of the Periodic Table of the elements or transition metals and more preferably are copper, zinc, aluminium, tin, lead, antimony, iron, nickel, cobalt or any alloy thereof. Suitable alloys include brass and steel.

The invention further provides lubricating compositions comprising a mineral or synthetic base oil and an oleophilic graphite/metal composition.

The invention also further provides solid composites comprising an oleophilic graphite intimately mixed with a metal.

Preferably the metal is present in the metal/graphite mixture in an amount of 5–95% by weight more preferably 15–85% by weight, based on the total weight of graphite and metal.

The grinding preferably takes place with the substantial exclusion of air, this is most easily ensured by filling the grinding chamber with the organic grinding liquid.

In one method of carrying out the grinding the grinding liquid and graphite/metal mixture is circulated continuously through the grinding chamber, the grinding chamber being always substantially full of grinding liquid, and no air being allowed to become entrapped in the grinding chamber.

In order to prepare the intimate mixtures of oleophilic graphite and metal, a mixture of natural or synthetic graphite and the metal can be prepared before grinding or natural or synthetic graphite and metal can be added separately to the grinding chamber and the mixing takes place with the grinding.

The oleophilic graphite/metal compositions of the present invention are useful in the formation of solid compacts. In order to form the compact the oleophilic graphite/metal material is compressed, preferably at a pressure of above 10 tons per square inch, in a conventional press. The cold pressed compacts formed can be heated to improve their mechanical strength.

When, to improve the physical properties of the compacts, the cold pressed compacts are heated, it has been surprisingly found that when using some low melting point metals, e.g. lead, the cold pressed compacts can be heated to a temperature higher than the melting point of the metal in an inert atmosphere without any melting, degradation or dimensional change taking place. The compacts subjected to this heat treatment have increased mechanical strength compared with the original cold-pressed compacts.

Metals and alloys which can be used as bearing materials are especially useful in forming lubricating compositions and compacts which are to be useful in anti-friction application.

A particularly preferred metal is lead, and compacts formed of intimate mixtures of lead and oleophilic graphite by the process of the present invention preferably comprise from 20 to 90% by weight lead and more preferably 75 to 85% lead.

It has very surprisingly been found that a compact containing 80% lead and 20% oleophilic graphite prepared by the process of the invention can be heated in air to a temperature in excess of 350° C. with little oxidation of the components taking place.

Satisfactory metal/graphite mixtures can be obtained by grinding in most organic liquids but it is desirable to use one the bulk of which can be easily removed from the graphite/metal mixture. Those liquids distilling below 500° C. and having a viscosity below 600 centistokes at 100° F. (38° C.) are therefore preferred. Liquids having a surface tension below 72 dynes/cm., preferably from 10 to 40 dynes/cm., at 25° C. are preferred. The liquids preferably have a viscosity less than 30 centistokes at 100° F. (38° C.).

Suitable organic liquids are lower molecular weight hydrocarbons, including straight-chain or branched-chain, saturated or unsaturated aliphatic, saturated or unsaturated, substituted or unsubstituted, cycloaliphatic, and substituted or unsubstituted aromatic compounds. Examples of such compounds are n-heptane, octene-2, 2,2,4-trimethylpentane, cyclohexane, benzene or toluene. Branched alkyl compounds are particularly preferred. Other suitable organic liquids are those compounds which contain fluorine, chlorine, or phosphorus and chlorine, for example, carbon tetrachloride.

Other suitable organic liquids are the polar oxygen compounds such as isopropyl alcohol. Silicone fluids can also be used.

For best results, the amount of graphite and metal in the graphite/metal/organic liquid mixture should not exceed 50% wt.; preferably it should be from 2 to 20% wt.

The grinding may be carried out in any suitable grinding mill or device and it is preferable to continue the grinding until a metal/graphite mixture having a surface area (as determined by nitrogen adsorption) of at least 20 and preferably from 30 to 800, square metres per gram is obtained. Usually this can be achieved by grinding at normal temperatures for the required period but the temperature of the mixture may be artificially increased if desired, for example, up to 400° C. In this case, liquids which have viscosities up to 600 centistokes at 100° F. (38° C.) may be used, for example, mineral lubricating oils, ranging from "Spindle" oils to "bright stocks."

One of the quickest and most effective techniques is to carry out the grinding in a vibratory ball mill.

It is desirable to exclude air so far as possible during the grinding operation and this can be most easily achieved by filling the mill with the organic liquid first, followed by the balls, graphite and metal. A suitable procedure is to fill the mill with the liquid, add half the balls, then the graphite and metal and finally the rest of the balls.

When using a ball mill, it is of course desirable to use balls made of material which does not react with the graphite or metal and which does not wear unduly during the grinding. Vibratory ball mills usually contain steel balls and these are suitable for the present purpose. It is prefererd to use a hard grade of steel for the balls.

A magnetic filter can be used to remove small steel particles from the slurry when the metal used is not ferromagnetic. A circulatory system can also be used wherein the slurry is pumped through an external magnetic filter and then returned to the mill.

A suitable vibratory ball mill is sold under the trade name "Megapact," manufatcured by Pilamec Limited. The grinding effect is produced by the impact of the balls upon the material in the mill and upon each other.

Preferably the amplitude of vibration should be at least 2 mm. and the frequency at least 1000 cycles per minute. More preferably the amplitude of vibration should be at least 3 mm. and the frequency at least 1500 cycles per minute.

The slurry of graphite and metal can be separated from the balls by sieving or by displacement by another liquid and sieving.

If a relatively high boiling organic liquid is used for grinding it is preferred to displace this liquid by a low boiling liquid.

This liquid can then be removed by boiling from the slurry. It is preferred to use vigorous boiling.

It is also possible to filter the slurry to obtain a metal/graphite filter cake.

In either case it is preferred to remove the last traces of solvent by heating the filter cake in a vacuum oven for several hours, for example, at 100° C. and at 1 mm. mercury.

Any oxygen present in the unground material or grinding chamber can have a tendency to combine with the metals to form oxides, especially the lower oxides. The mixtures of the present invention include those contaminated by small amounts of such oxides.

The oleophilic graphite/metal mixtures possess lubricating properties and can form very stable dispersions in lubricating base oils. Preferably the dispersion contains at least 1% by weight of the oleophilic graphite/metal mixture.

Suitable mineral oils are refined mineral oils obtained from petroleum, for example, those having a viscosity at 210° F. within the range from 2 to 50 centistokes preferably from 4 to 40 centistokes.

Synthetic lubricating oils include organic esters, polyglycol ethers, polyphenyl ethers, fluorinated hydrocarbons, silicate esters, silicone oils and mixtures thereof.

The most important class of synthetic oils are the organic liquid polyesters, particularly the neutral polyesters, having a viscosity at 210° F. within the range from 1 to 30 centistokes. The expression "polyester" is used to mean esters having at least two ester linkages per molecule. The expression "neutral" is used to mean a fully esterified product. Examples of suitable polyesters include liquid diesters of aliphatic dicarboxylic acids and monohydric alcohols (for example, dioxtyl sebacate, octyl nonyl sebacate, and the corresponding azelates and adipates), liquid diesters of aliphatic dicarboxylic acids and phenols, and more complex polyesters.

The oleophilic graphite/metal mixture also has the power to thicken oils into greases.

The amount of oleophilic graphite/metal mixtures required to thicken the base oil will depend on the nature of the oil and the consistency of grease required. For most purposes an amount up to 50% wt., based on the final grease, will be used. However, it is remarkable that the oleophilic graphite/metal mixture can thicken oils to provide greases with very useful properties at concentrations as low as from 10 to 20% wt., based on the final grease, and this is the preferred concentration range. In some cases this represents as little as 3% by volume.

The ability to thicken lubricating oils to greases is thought to be dependent on the volume loading of the thickener in the base oil and it is very surprising that the compositions of the present invention can thicken oils into greases at very low volume loadings e.g. less than 5% by volume. In some cases a volume loading as low as 3% by volume of a grease can thicken the oil to a grease.

The greases can be made by any of the methods described in U.K. Pat. 1,168,784.

The invention will be further described with reference to the examples.

EXAMPLE 1

A series of lead/graphite compositions were prepared by grinding a mixture of lead and graphite in a vibratory ball mill.

The mill used for the grinding was a vibratory ball mill called by the manufacturer a "Megapact" mill. In the version used the grinding chambers were steel cylinders of 1¼ inch internal diameter by 15 inches long and were nearly filled with ¼ inch diameter steel balls. The mill was fitted with a one eighth horsepower electric motor and the oscillation could be adjusted from 1 to 5 mm. In operation, each cylinder was filled completely with the n-heptane and the steel balls and 25 to 80 grams of graphite and lead were added thus ensuring exclusion of air. This left about 150 to 200 cc. n-heptane in each cylinder. The ends were then sealed with metal caps fitted with rubber washers and the grinding was carried out. After grinding, the contents of the cylinders were placed in sieves which retained the balls and the n-heptane was removed from the oleophilic graphite/metal mixture by rapid evaporation.

The lead/graphite mixture was ground for 8 hours at an amplitude of vibration of 4 mm. and a frequency of vibration of 3000 cycles per minute. The ground mixture was separated from the balls and dried, its properties are shown below.

TABLE 1

| Lead in graphite, percent wt. | BET surface area, m.²/gm. | Heat of adsorption from n-Heptane | | |
|---|---|---|---|---|
| | | Cal./g. total solid | | Cal./g. graphite, n-$C_{32}$ |
| | | n-$C_{32}$ | n-Butanol | |
| 0 | 100 | 1.40 | 0.07 | 1.40 |
| 20 | 89 | 1.19 | | 1.49 |
| 40 | | 0.85 | 0.07 | 1.42 |
| 60 | 48 | 0.74 | 0.11 | 1.85 |
| 80 | 26 | 0.70 | 0.06 | 3.50 |
| 90 | 16 | 0.22 | 0.07 | 2.20 |
| 97.5 | | 0.02 | | 0.86 |

The dried powders were cold compressed at a pressure of 25 tons per square inch to form hard compacts, and their densities and wear values were measured. The wear value was measured on a pin-and-disc machine. The compacts were also heated to 350° C. in an atmosphere of nitrogen and density and wear values taken as for the unheated compacts.

The results are shown in Table 2.

In the pin-and-disc machine the load was 3 kg. and the sliding speed was 108 cm./sec.

TABLE 2

| Percent of lead in compact | Density after— | | Wear values | | | |
|---|---|---|---|---|---|---|
| | Cold compression, gms./cc. | Heating | Cold compressed | | After heating | |
| | | | k ×10⁻¹³, cm.⁻³g.⁻¹cm.⁻¹ | R | k ×10⁻¹³, cm.⁻³g.⁻¹cm.⁻¹ | R |
| 20 | 1.97 | 1.90 | 3.5 | ---- | 0.7 | ---- |
| 40 | 2.17 | 1.96 | 3.2 | 68 | 1.0 | 65 |
| 60 | 3.14 | ---- | ---- | ---- | ---- | ---- |
| 75 | ---- | 3.92 | 8.1 | 79 | 0.5 | ---- |
| 80 | 3.91 | 3.73 | 3.8 | 86 | 1.9 | 82 |
| 85 | 5.7 | ---- | 7.6 | 72 | ---- | ---- |
| 90 | 5.32 | 5.23 | 3.6 | ---- | 4.9 | 85 |

EXAMPLE 2

A series of tin and graphite powders were prepared by the method of Example 1 using tin in place of lead. The heat of adsorption properties of these powders are shown in Table 3.

TABLE 3

| Tin in graphite, percent wt. | BET surface area, m.² g.⁻¹ | Heat of adsorption from n-Heptane | | |
|---|---|---|---|---|
| | | Cal./g. total solid | | Cal./g. graphite, n-$C_{32}$ |
| | | n-$C_{32}$ | n-Butanol | |
| 0 | ca 100 | 1.4 | ---- | 1.4 |
| 10 | 119 | 2.04 | 0.14 | 2.26 |
| 26 | 105 | 1.56 | 0.14 | 1.96 |
| 40 | 84 | 1.20 | 0.13 | 2.00 |
| 60 | 66 | 0.69 | 0.06 | 1.72 |
| 70 | 52 | 0.35 | 0.06 | 1.15 |
| 80 | 36 | 0.48 | 0.09 | 2.39 |
| 90 | 17 | 0.40 | 0.05 | 4.00 |

Compacts were fabricated from these powders by cold pressing at two different pressures, the results are shown in Table 4.

TABLE 4

| Percent tin | Pressure 41,000 p.s.i. | | Pressure 65,000 p.s.i. | |
|---|---|---|---|---|
| | Density | R Hardness | Density | R Hardness |
| 10 | 1.73 | 56 | 1.81 | ---- |
| 20 | 1.90 | 60 | 1.97 | 64 |
| 40 | 2.36 | 65 | 2.40 | 69 |
| 60 | 3.04 | 72 | 3.11 | 76 |
| 80 | 4.23 | 80 | 4.26 | 83 |
| 90 | 5.08 | 81 | 5.19 | 80 |

Some of these samples were heated in nitrogen at 250° C. for 90 minutes (The melting point of tin is 232° C.). The properties of those compacts are shown in Table 5.

TABLE 5

| Percent tin | Pressure 41,000 p.s.i. | | Pressure 65,000 p.s.i. | |
|---|---|---|---|---|
| | Density | R Hardness | Density | R Hardness |
| 10 | 1.68 | 53 | 1.73 | 62 |
| 20 | 1.84 | 60 | 1.90 | 65 |
| 40 | 2.25 | 65 | 2.28 | 67 |
| 60 | 2.66 | 67 | 2.71 | 69 |
| 80 | 3.83 | 78 | 3.80 | 74 |

EXAMPLE 3

A series of graphite and zinc mixtures were prepared by the method of Example 1 using zinc instead of lead. The heat of adsorption properties of these powders are shown in Table 6.

TABLE 6

| Percent wt. of Zn in composition | Surface area BET $N_2$ ads., m.²/gm. of graphite | Heat of adsorption from n-heptane | | |
|---|---|---|---|---|
| | | Cal./g. total solid | | Cal./g. graphite, n-$C_{32}$ |
| | | n-$C_{32}$ | n-Butanol | |
| 10 | 113 | 1.78 | 0.48 | 1.98 |
| 30 | 155 | ---- | ---- | ---- |
| 40 | 138 | .83 | .095 | 1.37 |
| 80 | 235 | .54 | .063 | 2.71 |
| 90 | ---- | .54 | .054 | 5.44 |

EXAMPLE 4

A series of iron and graphite mixtures were formed by the method of Example 1 using zinc instead of lead. The heat of adsorption properties and surface area were measured and the results are shown in Table 7.

TABLE 7

| Percent wt. of Cu in composition | Surface area BET $N_2$ ads., m.²/gm. of graphite | Heat of adsorption from n-heptane | | |
|---|---|---|---|---|
| | | Cal./gm. total solid | | Cal./gm. graphite, n-$C_{32}$ |
| | | n-$C_{32}$ | n-Butanol | |
| 10 | ---- | 1.67 | .048 | 1.86 |
| 20 | 160 | 1.49 | .072 | 1.86 |
| 40 | ---- | 1.40 | .072 | 2.34 |
| 60 | ---- | 0.92 | .056 | 2.30 |
| 80 | 120 | 0.53 | .045 | 2.64 |
| 90 | ---- | 0.16 | .017 | 1.57 |
| 95 | ---- | 0.075 | .010 | 1.50 |

EXAMPLE 5

A series of copper and graphite mixtures were formed by the method of Example 1 using copper instead of lead. The heat of adsorption properties and surface area were measured and the results shown in Table 7.

TABLE 8

| Percent wt. of Cu in composition | Surface area BET $N_2$ ads., m.²/gm. of graphite | Heat of adsorption from n-heptane | | |
|---|---|---|---|---|
| | | Cal./gm. total solid] | | Cal./gm. graphite, n-$C_{32}$ |
| | | n-$C_{32}$ | n-Butanol | |
| 10 | 131 | 1.67 | .065 | 1.86 |
| 20 | 136 | 1.61 | .063 | 2.01 |
| 40 | 160 | 1.36 | .066 | 2.27 |
| 60 | 142 | .81 | .054 | 2.02 |
| 80 | 130 | .21 | .030 | 1.587 |
| 90 | ---- | .19 | .026 | 1.90 |
| 95 | ---- | .08 | .023 | 1.68 |

EXAMPLE 6

Greases were formed by dispersing some of the metal/graphite compositions prepared as in Examples 1–5 in a lubricating base oil of viscosity 160 Redwood No. 1 secs. at 140° F. and a viscosity index of 95.

Graphite/metal compositions containing nickel and antimony were also prepared using the method of Example 1. Data on the greases is given in Table 9 below.

TABLE 9

| Concentration of thickener, percent wt. | Composition of thickener | Unworked penetration, mm. | Worked penetration 60 strokes, mm. | DTD bleed |
|---|---|---|---|---|
| 17.5 | 100% graphite | ---- | 309 | 5.6 |
| 17.5 | 40% Sb, 60% graphite | 256 | 302 | 3.8 |
| 17.5 | 40% Sn, 60% graphite | 279 | 335 | 5.4 |
| 17.5 | 40% Zn, 60% graphite | 276 | 320 | 5.4 |
| 17.5 | 20% Zn, 80% graphite | 290 | 298 | 3.8 |
| 17.5 | 20% Ni, 80% graphite | 306 | 317 | 5.3 |
| 17.5 | 20% Fe, 80% graphite | 302 | 317 | 5.2 |
| 17.5 | 20% Cu, 80% graphite | 313 | 328 | 6.2 |
| 17.5 | 20% Sn, 80% graphite | 211 | 264 | 1.1 |
| 17.5 | 20% Pb, 80% graphite | ---- | 245 | 0 |
| 25 | 60% Pb, 40% graphite | 298 | 313 | 5.4 |

The grease containing 25% by weight of a thickener consisting of 60% lead and 40% graphite had a volume percent content of thickener of 3.3 and the grease thickened by 17.5% by weight of the 20% lead 80% graphite had volume percent content of thickener of 4.5.

Some of the grease compositions were tested in the Shell four ball tester for 60 secs. and the wear scars in mm. were measured. The results are shown in Table 10.

The concentration of thickener was 17.5% by weight.

TABLE 10

| Thickener composition | Load in kg. on tester | | | | |
|---|---|---|---|---|---|
| | 100 wear scar, mm. | 150 wear scar, mm. | 200 wear scar, mm. | 300 wear scar, mm. | 15 [1] wear scar, mm. |
| Oleophilic graphite | 0.96 | 1.48 | 1.82 | 2.50 | 0.82 |
| 20% Pb. 80% graphite | 0.70 | 1.00 | 1.55 | 2.30 | 0.85 |
| 60% Pb, 40% graphite | 0.63 | 1.90 | 1.02 | 1.64 | 0.75 |
| 40% Zn, 60% graphite | 0.70 | 0.90 | 1.8 | 2.6 | 0.39 |
| 40% Sn, 60% graphite | 0.62 | 1.7 | 1.8 | 2.3 | 0.50 |
| 40% Sb, 60% graphite | 0.90 | 1.22 | 1.40 | 1.78 | 0.48 |

[1] Test continued for 60 mins.

The grease comprising 60% lead and 40% graphite had a welding load of 430 kg. and a mean hertz load of 58 kg.

We claim:

1. A method of preparing a dispersion of a mixture of oleophilic graphite and a metal which comprises grinding effective proportions of a graphite selected from natural and synthetic graphite and a metal selected from Groups I-B, II-B, III, IV, V and the transition metals of the Periodic Table together below the surface of an organic grinding liquid boiling below 500° C. at normal pressure, having a surface tension of less than 72 dynes/cm. at 25° C. and a viscosity of less than 600 centistokes at 100° F. in the substantial absence of air till a surface area greater than 5 square metres per gram as measured by nitrogen adsorption is attained.

2. A method as claimed in claim 1 in which the metal is selected from copper, zinc, aluminium, tin, lead, antimony, iron, nickel cobalt and alloys thereof.

3. A method as claimed in claim 1 in which the amount of graphite and metal in the graphite, metal, organic grinding liquid mixture is from about 2 to 20% by weight.

4. A method as claimed in claim 1 in which the grinding is continued till a surface area of from about 30 to 800 square metres per gram is attained.

5. A method of preparing a mixture of oleophilic graphite and a metal which comprises separating the mixture of oleophilic graphite and metal from the dispersion prepared as claimed in claim 1.

6. A mixture of oleophilic graphite and a metal selected from Groups I-B, II-B, III, IV, V of the Periodic Table of elements and the transition metals, which has a ratio of heat of adsorption of n-dotriacontane from n-heptane to the heat of adsorption of n-butanol from n-heptane of at least 3.5:1 and a surface area of at least 5 square metres per gram.

7. A mixture as claimed in claim 6 which comprises about 5 to 95% by weight of oleophilic graphite and 95 to 5% by weight of the metal.

8. A lubricating composition comprising a lubricating oil and from about 1–50% by weight of an oleophilic graphite/metal mixture as claimed in claim 7.

9. A lubricating composition comprising a lubricating base oil and a grease forming amount of an oleophilic graphite/metal mixture as claimed in claim 1.

10. A solid composition prepared by compressing a mixture of oleophilic graphite and metal as claimed in claim 6 at a pressure of 10 to 50 tons per square inch pressure.

11. A solid composition prepared by compressing a mixture of eleophilic graphite and metal as claimed in claim 7 at a pressure of 10 to 50 tons per square inch.

12. A lubricating composition comprising a lubricating oil and from about 1–50% by weight of a mixture of oleophilic graphite and a metal prepared as claimed in claim 5.

13. A grease composition comprising a lubricating oil and a grease-forming amount of a mixture of oleophilic graphite and a metal prepared as claimed in claim 5.

14. A solid composition prepared by compressing a mixture of oleophilic graphite and metal prepared as in claim 5 to a pressure of 10 to 50 tons per square inch.

References Cited

UNITED STATES PATENTS

| | | | |
|---|---|---|---|
| 3,338,815 | 8/1967 | Groszek | 252—12 |
| 3,532,623 | 10/1970 | Groszek | 252—26 |

DANIEL E. WYMAN, Primary Examiner

I. VAUGHN, Assistant Examiner

U.S. Cl. X.R.

252—26, 29

UNITED STATES PATENT OFFICE
CERTIFICATE OF CORRECTION

Patent No. 3,629,107     Dated December 21, 1971

Inventor(s) Groszek et al

It is certified that error appears in the above-identified patent and that said Letters Patent are hereby corrected as shown below:

Col. 5, Line 75,
for "zinc"     read     -- iron --

Col. 6, paragraph headed "EXAMPLE 5", fourth line,
for "Table 7"     read     -- Table 8 --

Col. 7, Line 2,
for "hertz"     read     -- Hertz --

Col. 8, Line 14,
for "eleophilic"     read     -- oleophilic --

Column 6, TABLE 7, left-hand column, the heading,
for "Percent wt. of Cu in composition"     read     -- Percent wt. of Fe in composition --

Signed and sealed this 22nd day of August 1972.

(SEAL)
Attest:

EDWARD M. FLETCHER, JR.
Attesting Officer

ROBERT GOTTSCHALK
Commissioner of Patents